United States Patent
Kanemaru et al.

(10) Patent No.: US 9,683,774 B2
(45) Date of Patent: Jun. 20, 2017

(54) COOLING STORAGE EVAPORATOR SYSTEM FOR VEHICLE CLIMATE CONTROL

(71) Applicant: Honda Motor Co., Ltd., Tokyo (JP)

(72) Inventors: Junichi Kanemaru, Upper Arlington, OH (US); Shinji Kakizaki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 625 days.

(21) Appl. No.: 13/949,909

(22) Filed: Jul. 24, 2013

(65) Prior Publication Data
US 2015/0027145 A1    Jan. 29, 2015

(51) Int. Cl.
| | |
|---|---|
| F25D 3/00 | (2006.01) |
| B60H 1/32 | (2006.01) |
| F25B 41/00 | (2006.01) |
| F25D 17/04 | (2006.01) |
| B60H 1/00 | (2006.01) |
| B60H 1/34 | (2006.01) |
| B60H 3/00 | (2006.01) |
| B60H 1/02 | (2006.01) |
| F25D 21/12 | (2006.01) |

(52) U.S. Cl.
CPC ........... F25D 21/125 (2013.01); B60H 1/005 (2013.01); B60H 1/3227 (2013.01); B60H 1/3233 (2013.01)

(58) Field of Classification Search
CPC .. B60H 1/321; B60H 1/00071; B60H 1/3233; B60H 1/00785; F25B 2700/2117; F25D 21/125

USPC ........ 454/152, 156, 159–161; 165/202, 236; 62/59, 133, 406, 212
See application file for complete search history.

(56) References Cited

U.S. PATENT DOCUMENTS

| | | | |
|---|---|---|---|
| 4,546,617 A | 10/1985 | Suzuki et al. | |
| 5,216,895 A | 6/1993 | Kawai et al. | |
| 5,546,754 A * | 8/1996 | Terao | B60H 1/3207 62/133 |
| 5,893,407 A | 4/1999 | Okamoto et al. | |
| 6,135,201 A * | 10/2000 | Nonoyama | B60H 1/00064 165/202 |
| 6,311,763 B1 * | 11/2001 | Uemura | B60H 1/00664 165/43 |
| 6,330,909 B1 | 12/2001 | Takahashi et al. | |
| 6,430,951 B1 | 8/2002 | Iritani et al. | |

(Continued)

OTHER PUBLICATIONS

International Search Report and Written Opinion of PCT/US2014/042454 dated Nov. 4, 2014, 10 pages.

*Primary Examiner* — Allen Flanigan
*Assistant Examiner* — Filip Zec
(74) *Attorney, Agent, or Firm* — Rankin, Hill & Clark LLP

(57) ABSTRACT

A cooling storage evaporator system employs a pivoting frost control door upstream from an evaporator that, when closed, inhibits air from passing through a lower portion of the evaporator. Closing the frost control door results in condensed water freezing on a lower portion of the evaporator when the AC is ON. When a vehicle engine is turned OFF when the vehicle stops in an idle condition, thereby turning the compressor OFF, the frost control door opens so that air passes over the evaporator, including the frozen portion thereof, melting the frozen condensed water to maintain the cool outlet air temperature at the vent.

13 Claims, 3 Drawing Sheets

(56) References Cited

U.S. PATENT DOCUMENTS

| | | | |
|---|---|---|---|
| 7,823,631 B2* | 11/2010 | Tonnelier | B60H 1/00057 165/100 |
| 8,187,063 B2 | 5/2012 | Kanemaru et al. | |
| 8,302,417 B2* | 11/2012 | Major | B60H 1/005 165/203 |
| 8,443,873 B2* | 5/2013 | Nanaumi | B60H 1/0005 165/202 |
| 2004/0144107 A1 | 7/2004 | Breton et al. | |
| 2009/0235679 A1* | 9/2009 | Bagley | F25D 21/02 62/140 |
| 2010/0304654 A1 | 12/2010 | Kakizaki et al. | |
| 2012/0060522 A1 | 3/2012 | Markowitz et al. | |
| 2012/0304670 A1 | 12/2012 | Kumar et al. | |
| 2013/0047639 A1 | 2/2013 | Stannard et al. | |
| 2013/0081416 A1* | 4/2013 | Kim | F25D 21/006 62/151 |

* cited by examiner

COOLING STORAGE EVAPORATOR SYSTEM FOR VEHICLE CLIMATE CONTROL

BACKGROUND

The present disclosure relates to a vehicle HVAC system, and more particularly to a cooling storage evaporator for a vehicle HVAC system.

When a vehicle stops at idle, fuel efficiency can be improved by turning the engine off. Where the compressor in a vehicle HVAC or climate control system is driven by the engine, turning the engine off results in the compressor also being turned off. Accordingly, the delivery of cooling fluid to the evaporator can be disrupted, causing the air temperature at a vent to suddenly rise, and thereby making it difficult to maintain cabin comfort.

SUMMARY

In view of the above background, a cooling storage evaporator system is provided. According to one aspect, the vehicle cooling storage evaporator system includes an evaporator having a first portion and a second portion, and a frost control door disposed upstream from the evaporator. The frost control door is movable between an open position and a closed position when the vehicle engine is in an ON condition. When the frost control door is closed, air from a blower is allowed to pass over the first portion of the evaporator while being prevented from passing over the second portion of the evaporator, whereas when the frost control door is open, air from the blower is allowed to pass over the first and second portions of the evaporator.

According to another aspect, a vehicle HVAC system includes a blower, a vent outlet, and the cooling storage evaporator system. The blower is disposed upstream from the cooling storage evaporator system, and the vent outlet is disposed downstream from the cooling storage evaporator system.

According to yet another aspect, a method for operating a vehicle air conditioning system includes directing air from a blower to a vent outlet through an evaporator. When a vehicle engine is in an ON condition, ice is caused to accumulate in the evaporator. When the vehicle engine is in an idle OFF condition, the air is directed through the ice in the evaporator.

DETAILED DESCRIPTION

A cooling storage evaporator system will be described herein with reference to the appended figures. The description with reference to the figures is made to exemplify the cooling storage evaporator system disclosed herein. As such, reference to the figures is not intended to limit the scope of the appended claims.

In an effort to improve fuel efficiency, certain vehicles, such as hybrids, have engines that can be turned off more frequently. Particularly, the vehicle engine is turned off when the vehicle is idling. While this serves to improve the fuel efficiency of the vehicle, certain vehicular features rely on the vehicle engine running. When the vehicle engine is turned off while the vehicle is idling, these features become inoperable. An example of an engine driven feature is a vehicle climate control systems that utilizes a compressor driven by the vehicle engine.

The vehicle climate control system allows passengers in a vehicle to control a climate in a vehicle passenger compartment. Such a system is frequently referred to as a vehicle heating, ventilation, and air conditioning (HVAC) system. To cool and dehumidify the passenger compartment, an HVAC system 100 performs an air conditioning function. To perform this function, the HVAC system 100 is provided with a cooling circuit 102 that executes a refrigeration or cooling cycle.

Figure 1:
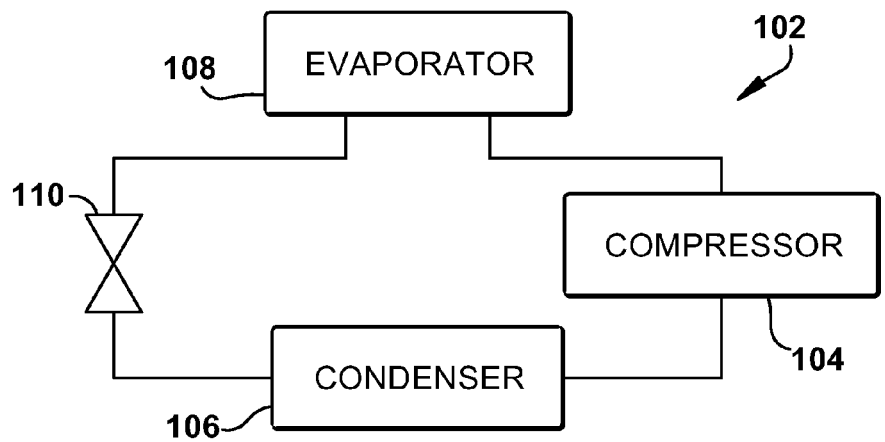
FIG. 1 is a schematic view illustrating a refrigeration/cooling circuit.

As illustrated in FIG. 1, the cooling circuit 102 includes a compressor 104 for pressurizing a refrigerant or cooling fluid, a condenser 106 for condensing the refrigerant into a high-pressure liquid, an evaporator 108 for circulating the high-pressure liquid refrigerant and serving as a heat exchanger for forced air passing over the evaporator 108, and a thermal expansion valve 110 for varying or regulating refrigerant flow based on a cooling demand. The compressor 104 is a pump that pressurizes and circulates refrigerant through the cooling circuit 102, and can be mounted at a front of a vehicle engine so as to be driven by the vehicle engine through a serpentine belt. To circulate the refrigerant, the compressor 104 has an outlet fluidly connected to the condenser 106 and an inlet fluidly connected to the evaporator 108.

The condenser 106 is a large heat exchanger that is typically located behind a vehicle grille. The condenser 106 has an inlet fluidly connected to the compressor 104 outlet for receiving pressurized refrigerant from the compressor 104, and an outlet fluidly connected to the evaporator 108 through the thermal expansion valve 110. The condenser 106 liquefies the high-pressure refrigerant received from the compressor 104 by passing the refrigerant through a series of tubes surrounded by fins, where the fins provide a large surface area for heat dissipation.

The thermal expansion valve 110 is disposed downstream from the condenser 106 and upstream from the evaporator 108, and operates to vary the refrigerant flow to the evaporator 108 based on the cooling demand. The thermal expansion valve 110 is typically a variable flow control device that opens wider to permit more refrigerant into the evaporator 108 as the cooling demand increases, and reduces a valve opening as the cooling demand decreases. The cooling demand can be monitored by a sensing bulb mounted on or near the evaporator 108. Alternative cooling circuits may employ an orifice tube, or other regulating mechanism, in place of the thermal expansion valve 110.

The evaporator 108 is a heat exchange mechanism provided in an air handling case 112 that absorbs heat from an air forced through the evaporator 108. The evaporator 108 has an inlet fluidly connected to the outlet of the condenser 106, with the thermal expansion valve 110 connected therebetween, an outlet fluidly connected to the inlet of the compressor 104, and contains a series of tubes and fins. Low pressure liquid refrigerant introduced into the evaporator 108 passes through the series of tubes. As forced air passes over the tubes and fins, the heat from the forced air is absorbed, thereby cooling the air. As the forced air is cooled, liquid water condenses on the outside of the evaporator 108, particularly on the outside of the tubes. To facilitate the understanding and simplify the illustrations, only the evaporator 108 from the cooling circuit 102 will be illustrated in the below figures, though it should be understood that the evaporator 108 remains a part of the above-described cooling circuit 102.

The presence of the refrigerant in the evaporator 108 induces heat absorption/transfer by the evaporator 108 with respect to the forced air. Circulation of the refrigerant to the evaporator 108, which is necessary for the air conditioning operation, is dependent on the compressor 104 pressurizing and circulating the refrigerant through the cooling circuit 102. In a system where the compressor 104 is driven by the vehicle engine, as is described above, refrigerant cannot be circulated while the vehicle engine is turned OFF. As an example, when the vehicle comes to a stop (idles) at a traffic light, the HVAC system 100 cannot perform the above-described air conditioning operation that relies on refrigerant being circulated to the evaporator 108 due to the compressor 104 not being operational. This results in a loss of control, or an ability to cool, the temperature of the forced air entering the passenger compartment, which can rise so as to not cool the passenger compartment.

As described herein, an engine idle OFF condition is defined as a condition where the vehicle is idling with the vehicle engine turned off and an engine ON condition is defined as a condition where the engine is on. Similarly, a compressor OFF condition is defined as a condition where the compressor 104 is turned off, and a compressor ON condition is defined as a condition where the compressor 104 is turned on. When the compressor 104 is driven by the engine, as is described herein, the engine idle OFF and compressor OFF conditions coincide while the engine ON and compressor ON conditions coincide.

Figure 2:
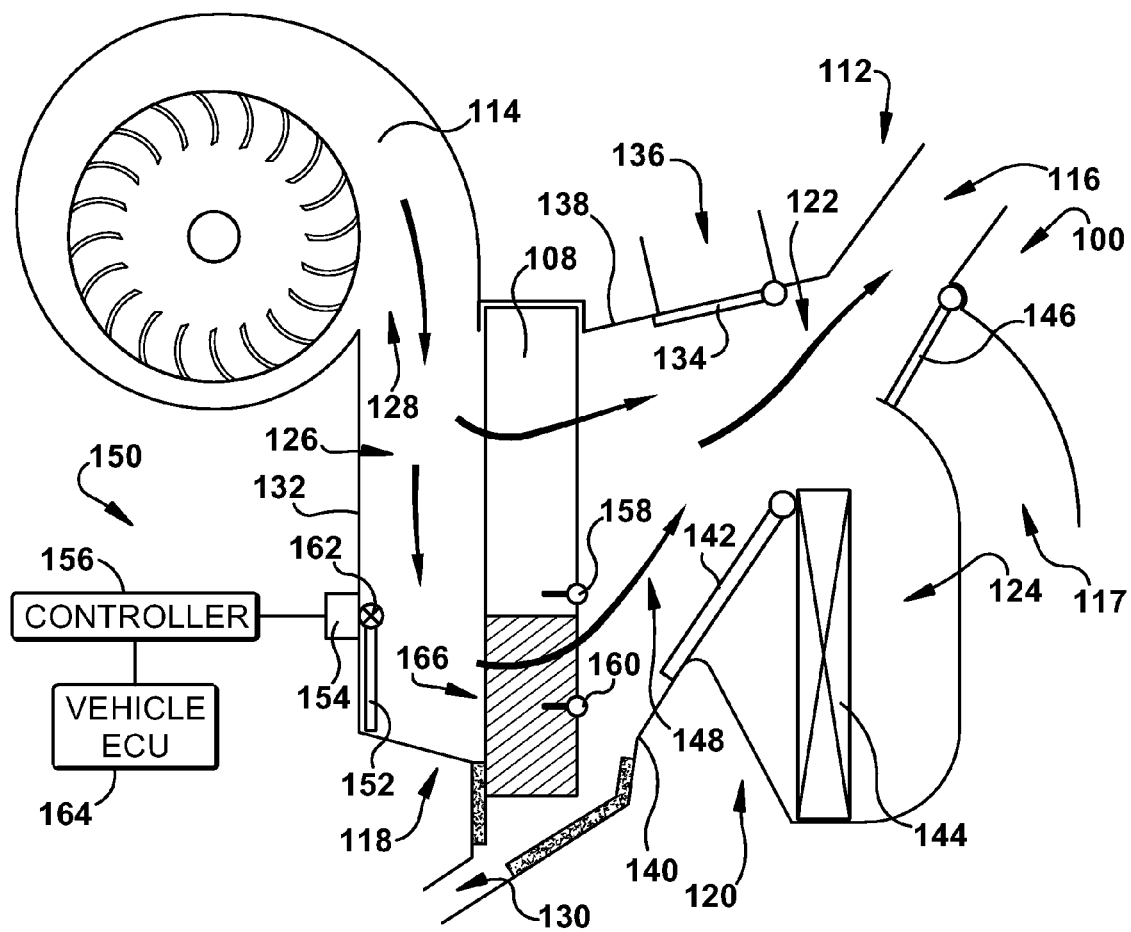
FIG. 2 is a schematic view illustrating a vehicle HVAC system employing a cooling storage evaporator system in a vehicle engine idle OFF condition.
Figure 3:
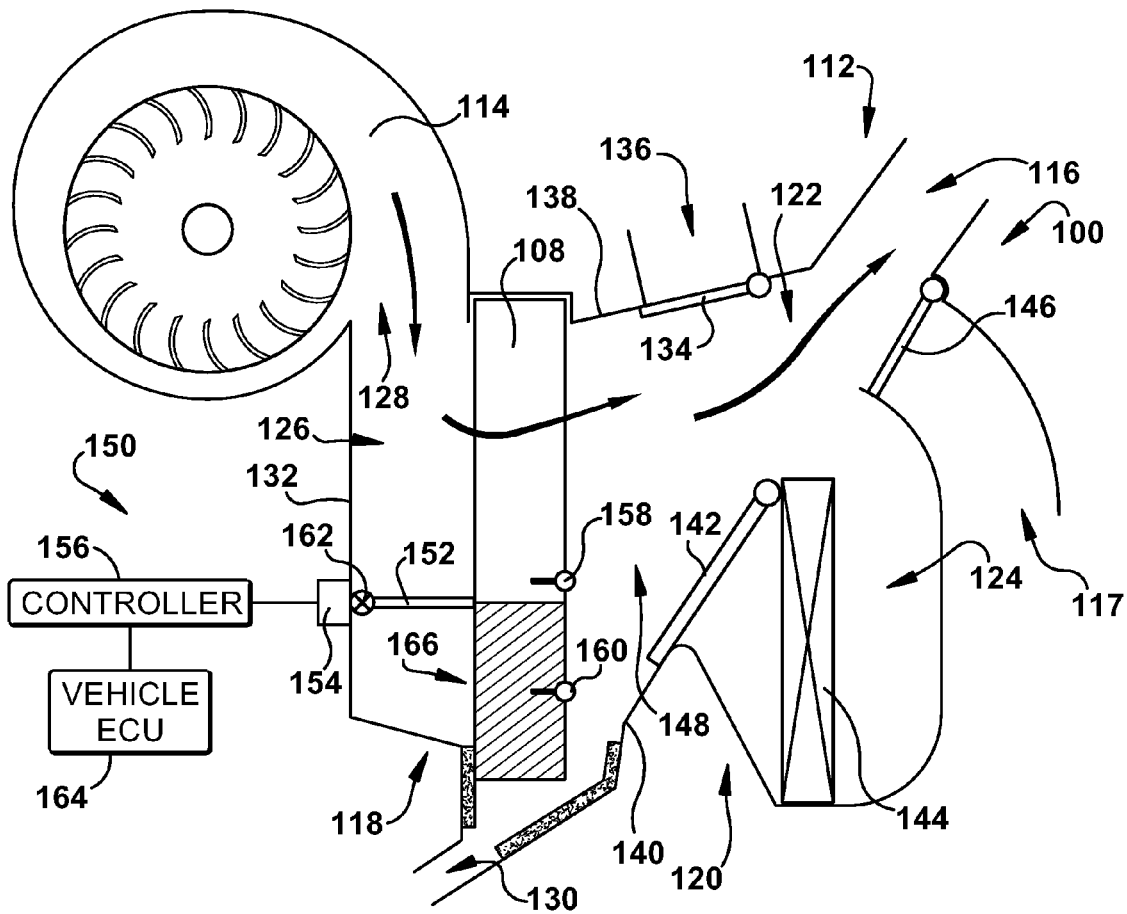
FIG. 3 is a schematic view illustrating a vehicle HVAC system employing the cooling storage evaporator system in a vehicle engine ON condition.

FIGS. 2 and 3 illustrate the HVAC system 100 having a forced air blower 114 (hereinafter, "blower 114"), the air handling case 112 (hereinafter, "case 112"), in which the evaporator 108 is held, and a cooling storage evaporator system 150. The blower 114, the case 112, and the cooling storage evaporator system 150 are typically held behind (e.g., in a forward direction relative to) a vehicle dashboard, with the case 112 defining a passage for forced air originating from the blower 114 to pass to the passenger compartment. As used herein, a forward direction references a direction toward a front of an associated vehicle (left in FIGS. 2 and 3) and a rearward direction references a direction toward a rear of the associated vehicle (right in FIGS. 2 and 3).

The blower 114 can take the form of any conventional forced air blower. As described herein, the forced air blower 114 has a generally circular body containing a fan and having an outlet to discharge the forced air generated by the fan. The outlet of the blower 114 is provided to fluidly communicate with the case 112 so as to introduce forced air into the case 112.

The case 112 defines the passage for the flow of the forced air to the passenger compartment. Further, the case 112 contains the evaporator 108 for cooling the forced air during air conditioning and a heater core 144 for heating the forced air during a heating operation. Though the illustrated case 112 defines a singular passage, to facilitate the description, it will be defined herein as having a forward portion 118 and a rearward portion 120, with the rearward portion 120 being described as further having an upper venting section 122 and a lower heating section 124.

The case forward portion 118 is the forward-most portion, and is the portion in which the evaporator 108 is mounted. As shown in FIGS. 2 and 3, the evaporator 108 has a vertically elongated shape, and the forward portion 118 has a vertical height sufficient to accommodate the evaporator 108 while leaving minimal excess space to a top and bottom of the evaporator 108. By leaving minimal space around the evaporator 108, it is ensured that substantially all of the forced air will pass through the evaporator 108.

An entry air flow passage 126 (hereinafter, "entry passage 126") is defined between a forward vertical wall 132 of the case 112 and the evaporator 108. At a position that is relatively forward of the evaporator 108, a forced air inlet opening 128 is defined through an upper (or side) surface of the case forward portion 120. The forced air inlet opening 128 is fluidly engaged with the outlet of the blower 114 such that the forced air blower 114 discharges forced air into the entry passage 126.

The case forward portion 118 further has a drain opening 130 defined through a lower portion thereof. The drain opening 130 is positioned so as to be below the evaporator 108 and is provided so as to communicate an enclosed portion of the case 112 with the ambient. As forced air passes through the evaporator 108 and condensation forms thereon, an outlet for dripping water is provided by the drain opening 130.

The case rearward portion 120 is disposed immediately rearward of the evaporator 108. The upper venting section 122 of the rearward portion 120 serves to direct forced air that has passed through the evaporator 108 to one of a vent outlet 116 and a defrost outlet 136, each of which are defined through the case rearward portion 120 in the upper venting section 122. The lower heating section 124 of the rearward portion 120 serves to heat forced air that has passed through the evaporator 108 when the HVAC system 100 is operating to heat the passenger compartment.

The upper venting section 122 is defined by a substantially horizontal upper wall 138 and an upwardly angled lower wall 140, and is separated from the lower heating section 124 by a heater control door 142. The lower heating section 124 is roughly egg-shaped when viewed in section, and projects rearward and downward from the upper venting section 122. The heater control door 142 is rotatably mounted at a proximal end within the air handling case rearward portion 120 so as to be movable between a closed position corresponding to the heater being off (shown in FIGS. 2 and 3) and an open position corresponding to the heater being on (not shown).

When in the closed position, as illustrated, the heater control door 142 has a distal end that is at least nearly in contact with the lower wall 140. The proximal end of the heater control door 142 is mounted such that, when in the closed position, the forced air that has passed through the evaporator 108 is substantially blocked from entering the lower heating section 124. Conversely, when the heater is turned on, the heater control door 142 rotates in a clockwise direction (in FIGS. 2 and 3) about the proximal end so as to direct the forced air into the lower heating section 124. A heater core 144 is disposed in the lower heating section 124 for heating the air received therein prior to the forced air being expelled from the vent outlet 116 or the defrost outlet 136 when the HVAC system 100 is operating to heat the passenger compartment. Though not illustrated or described in detail, the heater control door 142 has an actuator and controller associated therewith for placing the heater control door 142 in the appropriate (open or closed) position.

When cooling the passenger compartment with the heater control door 142 closed, the upper wall 138, the lower wall 140, and the heater control door 142 serve to form an air flow path 148 directing the forced air that has passed through the evaporator 108 toward the vent outlet 116 and the defrost outlet 136 without passing through the lower heating section 124. The forced air is then expelled from the vent outlet 116, the floor (heat or foot) outlet 117, and/or the defrost outlet 136, depending on a setting provided by a user at a user control system disposed within the vehicle passenger compartment.

The user control system (not illustrated) of the HVAC system 100 provides the user an option between different forced air discharge settings. For example, the user can choose between a "VENT", "DEFROST", "VENT AND FLOOR", and "FLOOR", "FLOOR AND DEFROST" setting. The HVAC system 100 is responsive to the user selected setting and is operable to have forced air pass from either, both, or neither of the vent outlet 116, the floor outlet 117, and the defrost outlet 136.

To selectively allow or block the forced air from passing through, the defrost outlet 136 has a defrost control door 134 and the vent outlet 116 has a vent control door 146. The defrost control door 134 is rotatably mounted at a proximal end to the case 112 at an edge of the opening defining the defrost outlet 136. A distal end of the defrost control door 134 is sufficiently spaced from the proximal end to extend to the opposite edge of the defrost outlet 136 so as to block the defrost outlet 136 when in a closed position (shown in FIGS. 2 and 3). The vent control door 146 is rotatably mounted at a proximal end to the case 112 at an edge of the opening defining the vent outlet 116. A distal end of the vent control door 146 is sufficiently spaced from the proximal end to extend to the opposite edge of the vent outlet 116 so as to block the vent outlet 116 when in a closed position (not shown).

The defrost control door 134 and the vent control door 146 are selectively opened and closed based on the user setting at the user control system using actuators and controllers. As described hereinbelow, the HVAC system 100 is presumed to be in the "VENT" setting, though it will be appreciated that a changing of the settings would not affect the operation of the cooling storage evaporator system 150.

As discussed above, when the vehicle comes to a stop, the engine is turned off so as to improve fuel economy. In this state, the vehicle engine is in the idle OFF condition and the compressor 104 is in the compressor OFF condition. To ensure that the forced air passing through the evaporator 108 and the outlet vent 116 remains cold when applying air conditioning to the passenger compartment, the cooling storage evaporator system 150 is employed. The cooling storage evaporator system 150 operates to freeze the condensed water that forms on a part of the evaporator 108 when the vehicle engine and the compressor 104 are in the ON condition. When the vehicle is idling and the vehicle engine is in the idle OFF condition and the compressor is in the compressor OFF condition, the forced air passing through the evaporator is cooled by the ice or frost formed on part of the evaporator 108. Particularly, when refrigerant is no longer being supplied to the evaporator (in the vehicle engine idle OFF and compressor OFF conditions), ice melting energy is used to cool the forced air. As the forced air passes through the frosted portion of the evaporator 108, the ice absorbs the heat from the forced air, thereby cooling the air.

To accomplish this operation, the cooling storage evaporator system 150 includes a frost control door 152 (hereinafter, "control door 152") rotatably attached to the case forward wall 132 through a rotatable joint 162 (hereinafter, "joint 162"), an actuator 154 for rotatably opening and closing the control door 152, a controller 156 for controlling the actuator 154, and first and second frost detecting thermal sensors 158, 160. The control door 152 is a planar body having a proximal end rotatably attached to the forward wall 132 through the joint 162 and a distal end disposed opposite the proximal end. The joint 162 is a rotatable member that allows the control door 152 to rotate about the proximal end that is attached to the joint 162. The control door 152 is attached to the forward wall 132 so as to be in a position that is upstream from the evaporator 108 and downstream from the blower 114 in a direction of air flow.

Particularly, the control door 152 is rotatable between a closed position (shown in FIG. 3), where the control door 152 extends substantially perpendicularly from the forward wall 132 (and an upstream inlet surface of the evaporator 108) and an open position, where the control door 152 rotates in a clockwise direction (in FIGS. 2 and 3) so as to be substantially vertical oriented and parallel with the forward wall 132 (shown in FIG. 2). As shown in FIG. 3, the length of the control door 152 and the joint 162 is slightly less than a distance between the forward wall 132 and a forward face of the evaporator 108.

In the illustrated embodiment, the actuator 154 is provided on an outside of the air handling case 112 along the forward wall 132. The actuator 154 is operably engaged with the control door 152 and the joint 162 so as to rotate the control door 152 about the joint 162. The actuator 154 can take any form that is capable of driving/rotating the control door 154 about the joint 162 so as to rotate the control door 154 between the open and closed positions. Further, the actuator 154 is electrically connected to the controller 156, which controls the actuator 154 to rotate the control door 154 between the open and closed positions.

The controller 156 is a processor or other similarly equipped unit that is electrically connected to the actuator 154 and a vehicle ECU 164. The vehicle ECU 164 can control and monitor functions of the vehicle. Among other functions, the vehicle ECU 164 controls the vehicle engine ON/OFF conditions, so as to place the vehicle engine in the idle OFF condition when the vehicle is idling and to place the vehicle engine in the ON condition when the vehicle is not idling. Moreover, the controller 156 receives a signal from the vehicle ECU 164 indicating to the controller 156 the present vehicle engine condition. The received signal can either be a continuous signal indicating the present vehicle engine condition, or can be a change-over signal indicating that a change in vehicle engine condition has occurred.

In turn, the controller 156 is configured to control the actuator 154 to open and close the control door 152 in response to the signal received from the vehicle ECU 164 with respect to the vehicle engine condition. Specifically, when the vehicle engine is in the idle OFF condition, the controller 156 controls the actuator 154 to locate, e.g., rotate and hold, the control door 152 in the open position (shown in FIG. 2). Conversely, when the vehicle engine is in the ON condition, the controller 156 controls the actuator 154 to locate, e.g., rotate and hold, the control door 152 in the closed position (shown in FIG. 3).

By opening and closing the control door 152, it is possible to selectively block and allow forced air to pass through a lower or frost portion 166 of the evaporator 108. As defined herein, the frost portion 166 is a portion of the evaporator 108 where frost may accumulate that may be disposed vertically below the control door 152 when the control door 152 is in the closed position. When the control door 152 is in the closed position, as shown in FIG. 3, the control door 152 substantially blocks forced air from traveling along the entry passage 126 to a position below the control door 152 and between the forward wall 132 and the evaporator frost portion 166. Without the warm forced air from the blower 114 passing over the evaporator frost portion 166, the condensed water on the frost portion 166 freezes, turning to frost. With the control door 152 in the closed position, the control door 152 directs air through an upper portion of the evaporator 108.

When the control door 152 is in the open position, as shown in FIG. 2, the entry passage 126 is opened and forced air from the blower 114 can reach and pass through the evaporator frost portion 166. The warm forced air passing over the frost portion 166 transfers heat to the frost formed on the evaporator frost portion 166, thereby melting the frost and cooling the air passing through the evaporator frost portion 166. The forced air that is cooled as a result of interaction with the evaporator frost portion 166 then follows the air flow path 148 and is discharged from the vent outlet 116 as cooled air.

A method of operating the vehicle HVAC system 100, particularly the air conditioning operation thereof, includes accumulating ice or frost on the evaporator 108, particularly the evaporator frost portion 166, while the vehicle engine is in the ON condition and is thereby driving the compressor 104 to be in the compressor ON condition. More specifically, the vehicle engine ON condition is detected by the vehicle ECU 164, and a signal indicating that the vehicle engine is in the ON condition is received by the controller 156. The controller 156 controls the actuator 154 to place and/or hold the control door 152 in the closed position illustrated in FIG. 3. When the control door 152 is in the closed position, forced air from the blower 114 is not allowed to pass over the evaporator frost portion 166. The absence of the warm forced air causes the water condensing on the evaporator frost portion 166 to freeze, resulting in frost accumulating thereon.

When the vehicle is idling and the vehicle engine is in the idle OFF condition, such that the compressor 104 is not being driven by the vehicle engine and is in the compressor OFF condition, forced air from the blower 114 is caused or allowed to pass over the evaporator frost portion 166 that has the frost accumulated thereon. As the forced air passes through the frosted evaporator frost portion 166, heat from the forced air is absorbed by the frost, causing the frost to melt and cooling the forced air. More specifically, the vehicle engine idle OFF condition is detected by the vehicle ECU 164, and a signal indicating that the vehicle engine is in the idle OFF condition is received by the controller 156. The controller 156 then controls the actuator 154 to place and/or hold the control door 152 in the open position illustrated in FIG. 2. When the control door 152 is in the open position, forced air from the blower 114 is caused or allowed to pass over the evaporator frost portion 166.

In addition to monitoring the vehicle engine condition, the vehicle ECU 164 can also monitor the condition of the vehicle air conditioning system. Particularly, when the vehicle air conditioning system is turned on at the user control system, the vehicle ECU 164 detects the ON condition of the air conditioning system and sends a signal to the controller 156 indicating that the vehicle air conditioning system is in the ON condition. The controller 156 can be configured so as to only perform the above operation if the vehicle ECU 164 detects that the air conditioning system is in the ON condition. Particularly, the controller 156 can be configured to only control the actuator 154 to close the control door 152 when the vehicle air conditioning system is in the ON condition.

It will be appreciated that the cooling storage evaporator system 150 will, when operational, cool the forced air passing through the evaporator frost portion 166 in an amount proportional to the amount of frost formed on the evaporator frost portion 166. In view of this relationship, the degree to which the forced air is cooled by passing through the evaporator frost portion 166 can be controlled by monitoring and regulating or controlling the amount of frost formed on the evaporator frost portion 166. To monitor the amount of frost formed on the evaporator frost portion 166, the cooling storage evaporator system 150 utilizes the first and second frost detecting thermal sensors (hereinafter, "sensors") 158, 160, which are provided to be electrically connected to and in communication with the controller 156.

The first and second sensors 158, 160 are thermal contact frost detecting elements that operate to detect either the presence or absence of frost. Both communicate with the controller 156 so as to send a signal thereto only when frost is in contact with the sensor 158, 160. As illustrated in FIGS. 2 and 3, the first sensor 158 is provided on the evaporator 108 at a position above the second sensor 160. The position of the first sensor 158 corresponds to a maximum frost amount or level, and the position of the second sensor 160 corresponds to a minimum frost amount or level. A range between the maximum and minimum frost amounts or levels (a predetermined range) is set as a normal operating condition.

When the control door 152 is in the closed position (FIG. 3), frost will accumulate on the evaporator frost portion 166 beginning at a lowermost end. This is because condensation water drips from the evaporator 108 to the lowermost end of the evaporator frost portion 166, and the evaporator frost portion 166 is furthest removed from the warm forced air in the entry passage 126, as the forced air is blocked by the control door 152. The frost will then accumulate upward along the evaporator frost portion 166. As more frost accumulates, a frost amount can be determined based on a frost height or level on the evaporator 108.

By placing the first and second sensors 158, 160 in specified locations corresponding with maximum and minimum frost amounts or levels, respectively, the frost level can be monitored, and then controlled. Particularly, since the frost level builds up from the lowermost end of the evaporator 108, the second sensor 160 is placed at a position corresponding to a minimum frost level. If the second sensor 160 is not in contact with frost, then there is an insufficient frost level and more needs to be created. When the second sensor 160 is not in contact with frost, the second sensor 160 will cease sending the signal to the controller 156, thereby notifying the controller 156 that more frost needs to be created, and triggering frost creation by the controller 156. During frost creation, the controller 156 can control the actuator 154 to locate, e.g., place and hold, the control door 152 in the closed position regardless of the vehicle engine condition.

In a preferable operating condition, the frost level is above the position of the second sensor 160 (minimum position) and below the position of the first sensor 158 (maximum position). In this condition, the second sensor 160 is sending a signal indicating the presence of frost to the controller 156 while the first sensor 158 is not sending a signal, thereby indicating an absence of frost. The controller 156 then continues operation as discussed above.

When the frost amount rises above the maximum frost level, the frost level or height on the evaporator 108 is disposed above the first sensor 158. In this condition, both the first and second sensors 158, 160 send a signal to the controller 156 indicating the presence of frost, notifying the controller 156 that the frost level is to be lowered, and triggering frost removal by the controller 156. During frost removal, the controller 156 can control the actuator 154 to locate, e.g., place and hold, the control door 152 in the open condition regardless of the vehicle engine condition.

Other types of thermal sensors for monitoring the amount of frost accumulated on the evaporator frost portion 166 can be used in place of the use of thermal contact frost detecting elements described above. Further, cooling storage evaporator system 150 can utilize only one thermal contact sensor to detect only a drop below the minimum frost level or a rise above the maximum frost level. Alternatively, more than two thermal contact sensors can be used to monitor the frost level between the minimum and maximum levels.

Additionally, in response to the detected frost level, the controller 156 need not only control the actuator 154 to place and hold the control door 152 in either the open position or closed position. Rather, the controller 156 can be operable to control the actuator 154 to locate, e.g., place and hold, the control door 152 at a partially open position, which is any position between the open position and the closed position. When in the partially open position, the control door 152 only partially blocks forced air from the blower 114 from reaching the evaporator frost portion 166. Frost accumulation can thereby be finely regulated relative to having a control door 152 that can only be held in the open and closed positions.

It will be appreciated that when in the partially open position, the further from the closed position the control door 152 is held, the more forced air is allowed to pass to the evaporator frost portion 166, and the slower the formation of frost, and vice versa. By monitoring the frost level on the evaporator frost portion 166, the controller 156 can control the actuator 154 to finely adjust a size of an opening provided between the control door 152 and the evaporator 108. This allows for finer control of the frost level.

Figure 4A:
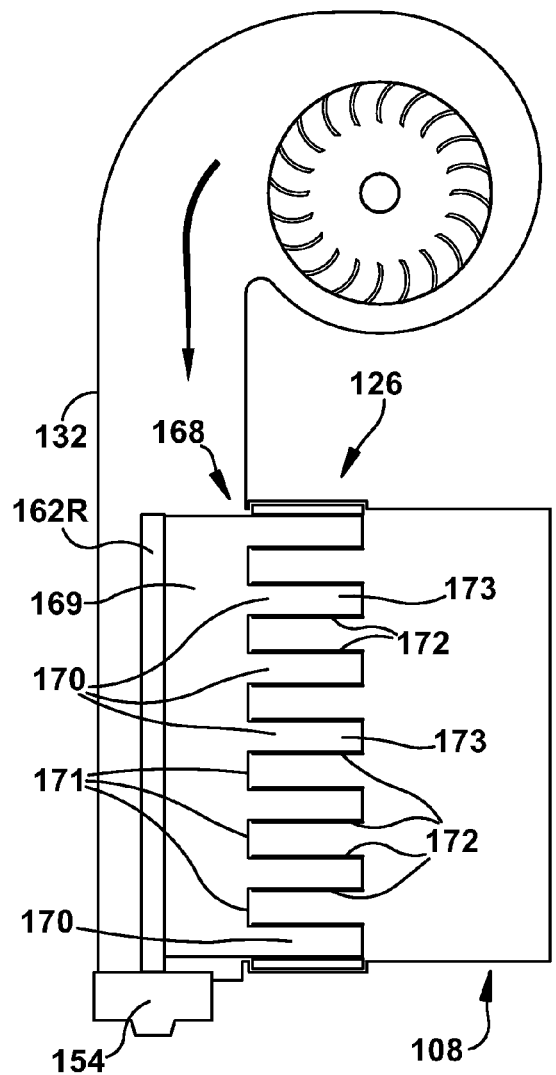
FIG. 4A is a schematic plan view illustrating a vehicle HVAC system employing the cooling storage evaporator system having a comb-type frost control door and baffle plates in the vehicle engine ON condition.
Figure 4B:
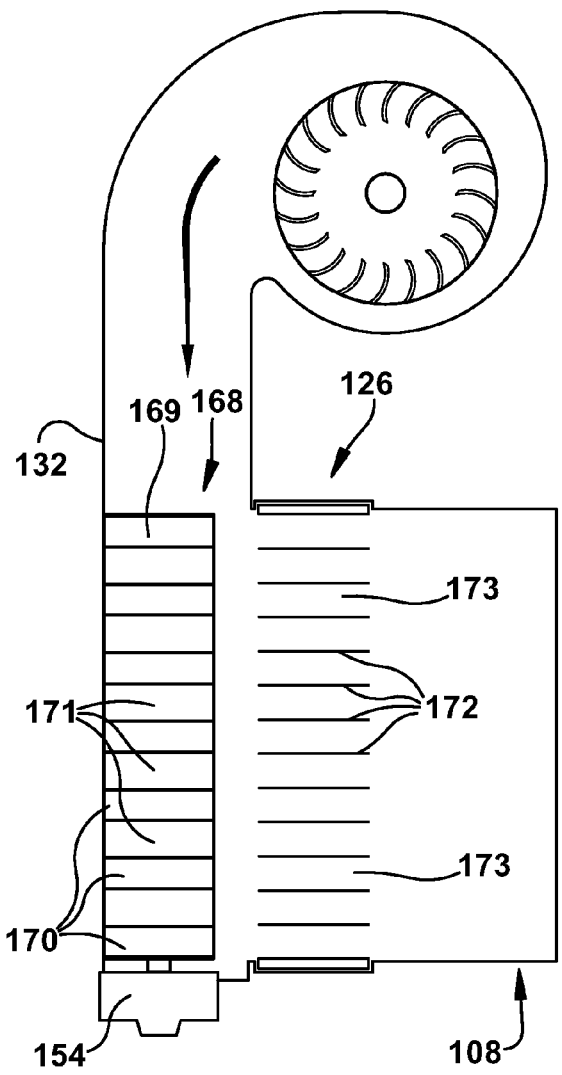
FIG. 4B is a schematic view illustrating a vehicle HVAC system employing the cooling storage evaporator system having a comb-type frost control door and baffle plates in the vehicle engine idle OFF condition.

Further, modifications can be made to the control door and the entry air flow passage 126 to further regulate the frost accumulation. FIGS. 4A and 4B illustrate one such modification wherein the cooling storage evaporator system 150 employs a comb-type frost control door 168 and baffle plates 172. The comb-type frost control door 168 has a comb structure and is rotatably attached to the air handling case forward wall 132 through a reverse joint 162R. The reverse joint 162R is similar to the joint 162, except that the reverse joint 162R allows the comb-type frost control door 168 to rotate from a closed position, where the comb-type frost control door 168 extends substantially perpendicularly from the forward wall 132 toward the evaporator 108, and an open position by rotating the comb-type frost control door 168 upward or downward.

The comb-type frost control door 168 has a body 169 with a plurality of projecting legs 170 spaced from each other by notches or cutouts 171 found between the legs 170. The legs 170 project from the body 169 and toward the evaporator 108 when the comb-type frost control door 168 is in the closed position (shown in FIG. 4A). When in the closed position, the body 169 and legs 170 are solid portions of the comb-type frost control door 168 that block forced air from passing.

The baffle plates 172 are generally vertically provided in the entry passage 126, and are positioned so as to fit or mesh with the comb-type frost control door 168, e.g., fit within the notches 171 defined between the legs 170 projecting from the body 169. To so fit, the baffle plates 170 may be spaced a predetermined distance from one another (in the up-down direction in FIGS. 4A and 4B) that is substantially equal to a distance between adjacent legs 170. The baffle plates 170 each can have a length (the left-right direction in FIGS. 4A and 4B) that is substantially equal to a distance of extension of each leg 170 from the body 169. Moreover, at least two baffle plate 172 can be provided in each notch 171 of the comb-type frost control door 168. Two baffle plates 172 define a passage 173 that leads to, e.g., communicates with, the evaporator 108.

As shown in FIG. 4A, when the comb-type frost control door 168 is in the closed position, the legs 170 and the baffle plates 172 cooperate so as to substantially block forced air from reaching a blocked area of the evaporator 108 disposed below the comb-type frost control door 168. When the comb-type frost control door 168 is in the open position, shown in FIG. 4B, forced air is free to reach the otherwise blocked area. With the frost control door 168 in the closed position, however, the forced air passes between the baffle plates 172 in the area once occupied by the legs 171 prior to reaching the evaporator frost portion 166. In this embodiment, the baffle plates 172 are disposed to concentrate air to selected sections of the frost (second) portion 166 of the evaporator 108 while substantially preventing air from reaching other sections of the frost portion 166 when the frost control door 168 is in the closed position. This configuration inhibits the entire frost portion 166 of the evaporator 108 from accumulating frost when the frost control door 168 is in the closed position. To facilitate the directing of the air, the baffle plates 172 can be curved toward the evaporator frost portion 166.

Additionally, a comb-type frost control door 168 can be employed without using baffle plates 172 to direct and/or agitate the air. Such a configuration would allow a reduced amount of air to reach the evaporator frost portion 166, reducing the amount of frost that could accumulate on the frost portion 166.

It is additionally envisioned that the cooling storage evaporator system can selectively open and close the frost door, thereby accumulating and melting frost on the evaporator frost portion, in response to the compressor changing between the compressor ON condition and the compressor OFF condition. As described above, the compressor is turned on and off as the vehicle engine is turned on and off. However, in assemblies where this is not necessarily the case, the cooling storage evaporator system can be configured to respond to the compressor rather than the vehicle engine.

Also, the vehicle engine OFF condition has been described as occurring when the vehicle engine is turned off during a driving condition when the vehicle comes to a stop, such as at a traffic light. However, the vehicle engine idle OFF condition can also encompass a situation where a vehicle is in park with the electrical circuitry turned on (e.g., keys remain in the ignition), such as when a driver is waiting to pick up a passenger. Accordingly, during such a condition, the cooling storage evaporator system 150 can operate to continue to provide cooling air to the passenger compartment, thereby eliminating the need to leave the vehicle running during such a stop.

Additionally, the precise location of attachment of the frost control door is amenable to variation throughout the air handling case. Particularly, it is envisioned that the frost control door can be mounted to any portion of the air handling case while remaining upstream from the evaporator and downstream from the forced air blower.

It will further be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicular cooling storage evaporator system, comprising:
    a controller;
    an evaporator having a first portion and a second portion, the second portion disposed below the first portion;
    a frost control door actuator in communication with the controller; and
    a frost control door disposed upstream from the evaporator and movable via the frost control door actuator between an open position where air from a blower is allowed to pass over the first and second portions of the evaporator and a closed position where air from the blower is allowed to pass over the first portion of the evaporator while being prevented from passing over the second portion of the evaporator,
    wherein the cooling storage evaporator system is configured to accumulate frost on at least a portion of the second portion of the evaporator while the frost control door is in the closed position,
    wherein at least one frost detecting thermal sensor is provided on the evaporator and in communication with the controller, the frost detecting thermal sensor being operable to detect an amount of frost formed in the second portion of the evaporator, the controller being configured to control the frost control door actuator depending on the detected frost amount on the second portion of the evaporator.

2. The cooling storage evaporator system according to claim 1, wherein said controller controls the frost control door actuator to locate the frost control door in the open position when the vehicle engine is in an idle OFF condition and to locate the frost control door in the closed position when the vehicle engine is in an ON condition.

3. The cooling storage evaporator system according to claim 2, wherein the controller is in communication with a vehicle air conditioning system and controls the frost control door actuator to locate the frost control door in the closed position when the vehicle engine is in the ON condition and the vehicle air conditioning system is operating.

4. The cooling storage evaporator system according to claim 2, wherein the controller controls the frost control door actuator to locate the frost control door in the open position while the vehicle engine is in the ON condition when the frost amount exceeds a maximum value of a predetermined range, and to locate the frost control door in the closed position while the vehicle engine is in the idle OFF condition when the frost amount is below a minimum value of the predetermined range.

5. The cooling storage evaporator system according to claim 4, wherein the controller controls the frost control door actuator to locate the frost control door in a partially open position between the open position and the closed position to maintain the amount of frost within the predetermined range.

6. The cooling storage evaporator system according to claim 1, wherein the frost control door has a comb structure that allows some air to pass through the frost control door to the evaporator second portion when the frost control door is in the closed position.

7. The cooling storage evaporator system according to claim 6, further comprising baffle plates disposed upstream from and adjacent to the second portion of the evaporator,
    wherein the baffle plates are disposed to concentrate air to selected sections of the second portion of the evaporator while substantially preventing air from reaching other sections of the second portion of the evaporator, such that the sections of the second portion of the evaporator to which air is concentrated do not accumulate frost.

8. The cooling storage evaporator system according to claim 1, wherein the first portion of the evaporator is disposed in a first direction from the frost control door when the frost control door is in the closed position and the second portion of the evaporator is disposed in a second direction, opposite from the first direction, from the frost control door when the frost control door is in the closed position.

9. The cooling storage evaporator system according to claim 1, wherein the at least one frost detecting thermal sensor includes a maximum frost level detecting thermal sensor operable to detect the presence of frost provided at a position on the evaporator corresponding to a maximum frost level,
    wherein the maximum frost level detecting thermal sensor sends a signal to the controller when in contact with frost, and
    wherein the controller controls the frost control door actuator to move the frost control door toward the open position when the maximum frost level detecting thermal sensor sends the signal to the controller indicating that frost is present at the maximum frost level.

10. The cooling storage evaporator system according to claim 9, wherein the at least one frost detecting thermal sensor includes a minimum frost level detecting thermal sensor operable to detect the presence of frost provided at a position on the evaporator corresponding to a minimum frost level,
    wherein the controller controls the frost control door actuator to move the frost control door toward the closed position when the minimum frost level detecting thermal sensor sends a signal to the controller indicating that frost is not present at the minimum frost level.

11. The cooling storage evaporator system according to claim 1, wherein the controller controls the frost control door actuator to move and hold the frost control door in a position between the open position and the closed position to maintain the frost level between a predetermined minimum and maximum value.

12. A vehicle HVAC system, comprising:
    a blower;
    an evaporator disposed downstream from the blower;
    a vent outlet disposed downstream from the evaporator;
    a controller and a frost control door actuator in communication with the controller; and
    a frost control door disposed downstream from the blower and upstream from the evaporator and movable via the frost control door actuator between an open position where air from the blower is allowed to pass over first and second portions of the evaporator and a closed position where air from the blower is allowed to pass over the first portion of the evaporator while being prevented from passing over the second portion of the evaporator, the second portion of the evaporator disposed below the first portion, wherein the vehicle HVAC system is configured to accumulate frost on the second portion of the evaporator while the frost control door is in the closed position, and wherein a frost level detecting sensor is provided on the evaporator and in communication with the controller, the frost level detecting sensor operable to detect a frost level on the second portion of the evaporator, the controller being configured to control the frost control door actuator to move and hold the frost control door in a position between the open position and the closed position to maintain the detected frost level between a predetermined minimum and maximum value.

13. The vehicle HVAC system according to claim 12, wherein said controller controls the frost control door actuator to move and hold the frost control door in the open position when the vehicle engine is in an idle OFF condition and to move and hold the frost control door in the closed position when the vehicle engine is in an ON condition.

\* \* \* \* \*